(12) United States Patent
Katz et al.

(10) Patent No.: US 8,860,713 B2
(45) Date of Patent: Oct. 14, 2014

(54) CONTROLLING VIRTUAL REALITY

(75) Inventors: Sagi Katz, Yokneam (IL); Mattias Marder, Haifa (IL)

(73) Assignee: Microsoft International Holdings B.V., Amsterdam (NL)

( * ) Notice: Subject to any disclaimer, the term of this patent is extended or adjusted under 35 U.S.C. 154(b) by 315 days.

(21) Appl. No.: 12/994,724

(22) PCT Filed: May 26, 2009

(86) PCT No.: PCT/IB2009/052191
§ 371 (c)(1),
(2), (4) Date: Nov. 24, 2010

(87) PCT Pub. No.: WO2009/147571
PCT Pub. Date: Dec. 10, 2009

(65) Prior Publication Data
US 2011/0074776 A1 Mar. 31, 2011

Related U.S. Application Data

(60) Provisional application No. 61/056,027, filed on May 26, 2008.

(51) Int. Cl.
*G06T 15/00* (2011.01)
*G06F 3/033* (2013.01)
*G09G 5/08* (2006.01)
*G06F 3/03* (2006.01)
*A63F 13/20* (2014.01)
*G06F 3/0346* (2013.01)

(52) U.S. Cl.
CPC ....... *G06F 3/0325* (2013.01); *A63F 2300/1043* (2013.01); *A63F 13/06* (2013.01); *G06F 3/0346* (2013.01)

USPC .......................................... 345/419; 345/158

(58) Field of Classification Search
CPC ............ A63F 13/06; A63F 2300/1043; G06F 3/0325; G06F 3/0346
See application file for complete search history.

(56) References Cited

U.S. PATENT DOCUMENTS 6,064,388 A * 5/2000 Reyzin ........................... 345/418
6,930,686 B1 * 8/2005 Aranda et al. ................. 345/443
(Continued)

FOREIGN PATENT DOCUMENTS

CN 1809801 7/2006
EP 1176559 A2 1/2002
(Continued)

OTHER PUBLICATIONS

Clark F. Olson et al.; Automatic Target Recognition by Matching Oriented Edge Pixels; IEEE Transactions on Image Processing, vol. 6, No. 1, Jan. 1997.*

(Continued)

*Primary Examiner* — Kee M Tung
*Assistant Examiner* — Frank Chen
(74) *Attorney, Agent, or Firm* — Rachael Vaughn; Leonard Smith; Micky Minhas

(57) ABSTRACT

A method of interfacing a person with a computer, the method comprising: providing the person with a device having: a shaft having an axis; a tsuba connected to the shaft and having a first side that extends away from the axis and faces the shaft; and a handgrip on a second side of the tsuba opposite the first side; acquiring an image of the device; determining an orientation of the device responsive to the image; and generating an action by the computer responsive to the orientation.

19 Claims, 14 Drawing Sheets

(56) References Cited

U.S. PATENT DOCUMENTS

| | | | |
|---|---|---|---|
| 7,112,168 B2* | 9/2006 | Dalebout et al. | 482/146 |
| 7,158,117 B2* | 1/2007 | Sato et al. | 345/158 |
| 7,768,498 B2 | 8/2010 | Wey | |
| 2002/0016204 A1 | 2/2002 | Kanno et al. | |
| 2004/0041822 A1* | 3/2004 | Iizuka et al. | 345/634 |
| 2004/0046736 A1 | 3/2004 | Pryor et al. | |
| 2006/0171592 A1* | 8/2006 | Amico et al. | 382/203 |
| 2006/0256072 A1* | 11/2006 | Ueshima et al. | 345/156 |
| 2007/0111779 A1* | 5/2007 | Osnato et al. | 463/16 |
| 2007/0117625 A1* | 5/2007 | Marks et al. | 463/30 |
| 2008/0031544 A1* | 2/2008 | Ueshima et al. | 382/289 |
| 2008/0220867 A1* | 9/2008 | Zalewski et al. | 463/37 |
| 2009/0055853 A1* | 2/2009 | Jung et al. | 725/10 |
| 2009/0129629 A1* | 5/2009 | Cheng et al. | 382/103 |
| 2009/0156308 A1* | 6/2009 | Hsu | 463/39 |
| 2010/0214214 A1* | 8/2010 | Corson et al. | 345/158 |

FOREIGN PATENT DOCUMENTS

| | | |
|---|---|---|
| JP | 07-185131 | 7/1995 |
| JP | 08-212327 | 8/1996 |
| JP | 2000020193 A | 1/2000 |
| JP | 2000202164 A | 7/2000 |
| JP | 2002140705 A | 5/2002 |
| JP | 2002305758 A | 10/2002 |
| JP | 2002306846 A | 10/2002 |
| JP | 2002-355441 A | 12/2002 |
| JP | 2003-083716 A | 3/2003 |
| JP | 2003210830 A | 7/2003 |
| JP | 2003210837 A | 7/2003 |
| JP | 2005185617 A | 7/2005 |
| JP | 2006178948 A | 7/2006 |
| JP | 2006301474 A | 11/2006 |
| JP | 2007163457 A | 6/2007 |
| JP | 2007167610 A | 7/2007 |
| WO | WO2005003945 A1 | 1/2005 |
| WO | WO2006/028158 A1 | 3/2006 |

OTHER PUBLICATIONS

Bulletin of the Metropolitan Museum of Art; vol. XXXII New York, Oct. 1937, No. 10.*

International Preliminary Report on Patentability dated Dec. 9, 2010, International Application No. PCT/IB2009/052191 filed May 26, 2009.

International Search Report dated Oct. 26, 2009, International Application No. PCT/IB2009/052191 filed May 26, 2009.

Toyama, Kentaro, et al., "Probabilistic Tracking in a Metric Space," Eighth International Conference on Computer Vision, Vancouver, Canada, vol. 2, Jul. 2001, 8 pages.

Official Communication dated Jan. 13, 2011, European Patent Office, European Patent Application No. 09757922.1-1245.

Response to Official Communication dated Jan. 31, 2011, European Patent Application No. 09757922.1-1245.

Office Action dated Oct. 23, 2012, Chinese Patent Application No. 200980119492.3.

English Abstract of Chinese Patent Publication No. CN1809801 published on Jul. 26, 2006.

Japanese Office Action dated Apr. 3, 2013, Japanese Patent Application No. 2011-511143.

English Abstract of Japanese Publication No. JP2002-355441 published on Dec. 10, 2002.

English Abstract of Japanese Publication No. JP2003-083716 published on Mar. 19, 2003.

Response to Office Action dated Feb. 26, 2013, Chinese Patent Application No. 2009801194923.

English Summary of the Arguments and Amended Claims filed in Response to Office Action dated Feb. 26, 2013, Chinese Patent Application No. 2009801194923.

Chinese Office Action dated Dec. 4, 2013, Chinese Patent Application No. 200980119492.3.

English translation of Chinese Office Action & Summary of the Decision on Rejection dated Dec. 4, 2013, Chinese Patent Application No. 200980119492.3.

Chinese Office Action dated Jun. 18, 2013, Chinese Patent Application No. 200980119492.3.

Response to Office Action dated Jun. 21, 2013, Japanese Patent Application No. 2011-511143.

English translation of Claims filed in Response to Office Action dated Jun. 21, 2013, Japanese Patent Application No. 2011-511143.

Response to Office Action dated Aug. 26, 2013, Chinese Patent Application No. 200980119492.3.

English translation of Summary of the Arguments and Amended Claims filed in Response to Office Action dated Aug. 26, 2013, Chinese Patent Application No. 200980119492.3.

English Abstract of Japanese Publication No. JP07-185131 published on Jul. 25, 1995.

English Abstract of Japanese Publication No. JP08-212327 published on Aug. 20, 1996.

English Abstract of Japanese Publication No. JP2000020193 published on Jan. 21, 2000.

English Abstract of Japanese Publication No. JP2000202164 published on Jul. 25, 2000.

English Abstract of Japanese Publication No. JP2002140705 published on May 17, 2002.

English Abstract of Japanese Publication No. JP2002305758 published on Oct. 18, 2002.

English Abstract of Japanese Publication No. JP2002306846 published on Oct. 22, 2002.

English Abstract of Japanese Publication No. JP2003210830 published on Jul. 29, 2003.

English Abstract of Japanese Publication No. JP2003210837 published on Jul. 29, 2003.

English Abstract of Japanese Publication No. JP2005185617 published on Jul. 14, 2005.

English Abstract of Japanese Publication No. JP2006178948 published on Jul. 6, 2006.

English Abstract of Japanese Publication No. JP2006301474 published on Nov. 2, 2006.

English Abstract of Japanese Publication No. JP2007163457 published on Jun. 28, 2007.

English Abstract of Japanese Publication No. JP2007167610 published on Jul. 5, 2007.

English Abstract of Pot Publication No. WO2005003945 published on Jan. 13, 2005.

Notice of Allowance dated Nov. 5, 2013, Japanese Patent Application No. 2011-511143.

Partial English translation of Notice of Allowance dated Nov. 5, 2013, Japanese Patent Application No. 2011-511143.

* cited by examiner

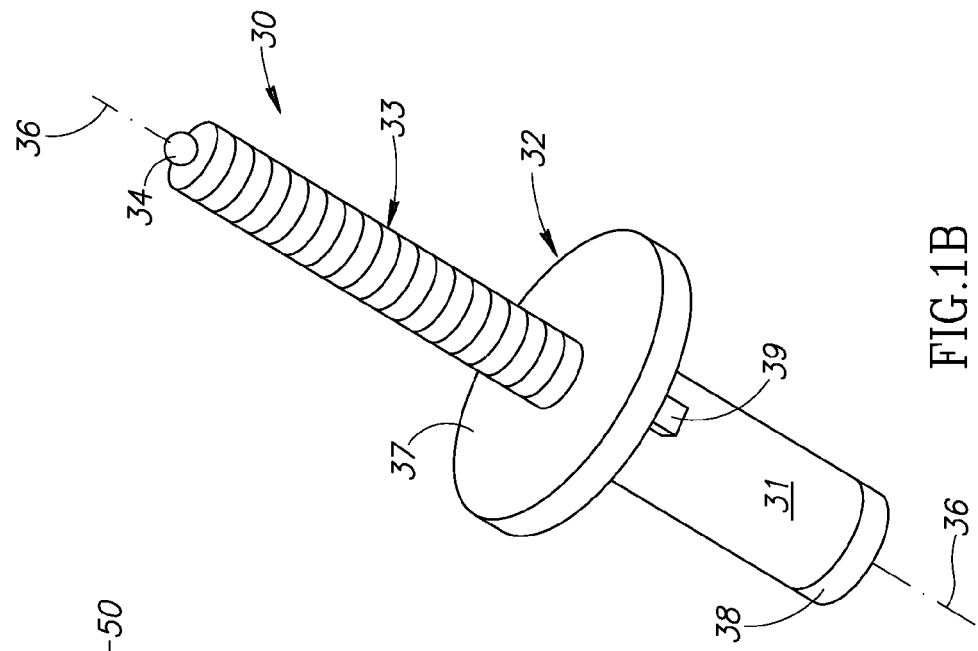
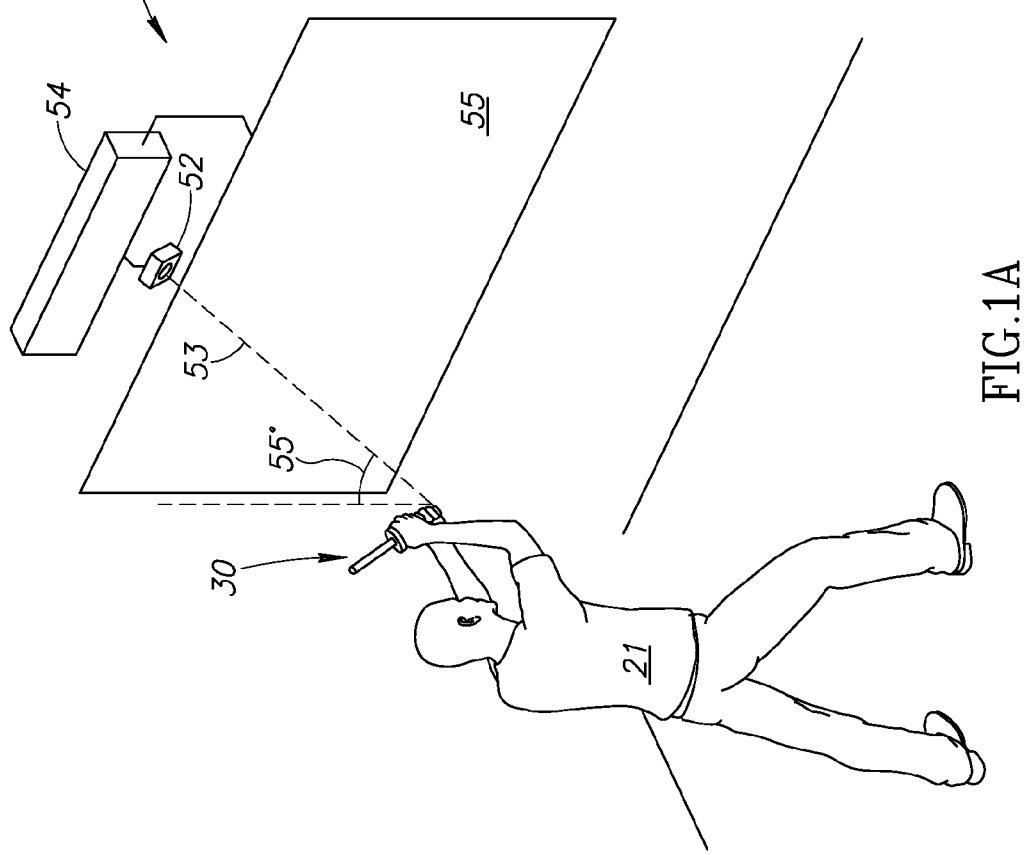
FIG.1B
FIG.1A

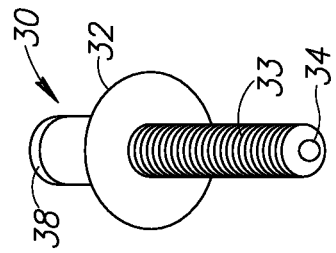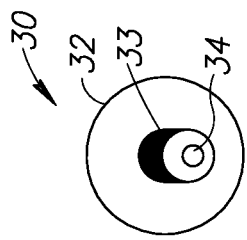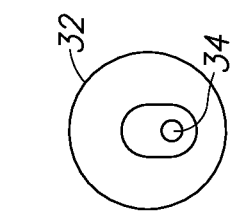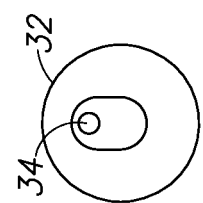
FIG.2D  Rx = 0°  Ry = 50°
FIG.2E  Rx = 0°  Ry = 60°
FIG.2F  Rx = 0°  Ry = 90°

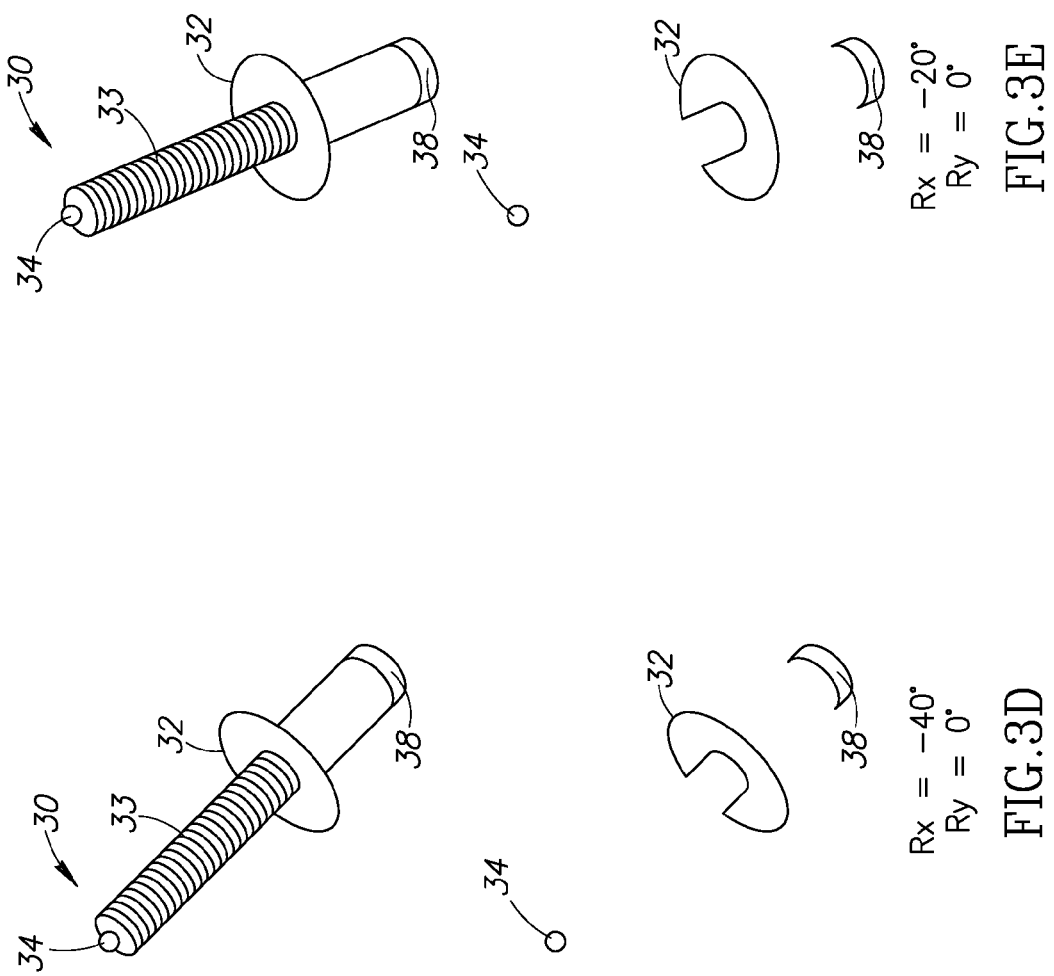

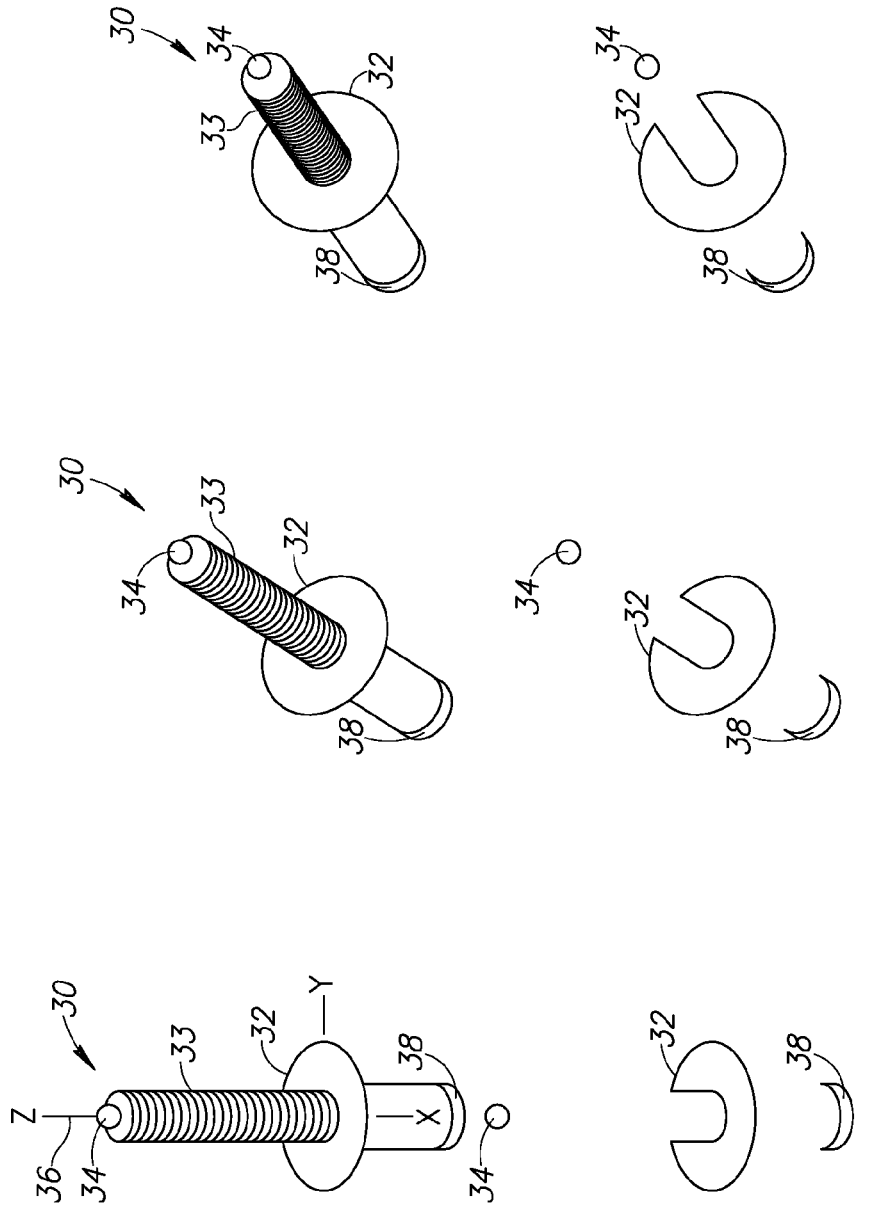

Rx = 20°
Ry = 90°

Rx = 20°
Ry = 60°

Rx = 20°
Ry = 50°

US 8,860,713 B2

CONTROLLING VIRTUAL REALITY

RELATED APPLICATIONS

The present application claims the benefit under 35 U.S.C. §119(e) of U.S. Provisional Patent Application 61/056,027 filed May 26, 2008 the disclosure of which is incorporated herein by reference.

FIELD OF THE INVENTION

The invention relates to interfacing a human with a computer and optionally to integrating a person with a computer to generate a virtual reality.

BACKGROUND

In the beginning, there was the mouse and the keyboard. And the mouse and the keyboard interfaced the human and the computer. However, as technology developed, computers acquired capacity to receive and process data sufficient to provide a cornucopia of relatively complex, real time, user applications that use or require more seamless and natural interfacing with human users than that provided by the mouse and keyboard.

Among familiar applications that use or require enhanced human machine interfacing are, by way of example, voice recognition services that enable a user to input data to a computer by talking to it, cell phone computer games and virtual realities that operate in real time. Many of these applications require or can benefit from, a capability to interpret and/or use human gestures responsive to images of a person making the gestures. As a result, considerable research efforts and resources are invested in developing gesture recognition apparatus and algorithms capable of receiving visual data in real time and processing the data to recognize and interpret human gestures.

A human gesture is considered to be any conscious or unconscious element of body language that conveys information to another person and/or a computer. By way of examples, a gesture may be any conscious or unconscious facial expression made in response to another person and/or a computer, a hand or body pose or motion made in response to a challenge or stimulus provided by a video game, virtual reality environment or multimedia presentation. Gesture recognition technology (GRT), is considered to comprise hardware and/or software technology configured to recognize, interpret and/or use human gestures responsive to images of a person making the gestures.

SUMMARY

An aspect of some embodiments of the invention, relates to providing methods of determining a spatial location and/or orientation of an object used by a person to interact with a computer.

An aspect of some embodiments of the invention relates to forming the object having a structure comprising first and second parts that are useable to determine 3D spatial location and/or orientation of the object from an, optionally conventional, 2D image of the object. In an embodiment of the invention, a projection of the first part of the structure onto the second part of the structure in an image of the object provides an indication of the orientation of the object. Optionally, the first and second parts are used to determine position and/or orientation of the object responsive to a 3D "depth map" of the object and/or of a scene in which the object is located.

According to an aspect of some embodiments of the invention, the object is provided with an inventive configuration of fiducial markings for indicating location and/or orientation of the object. Optionally, the fiducial markings are used to determine orientation of the object from a conventional 2D image of the object. Optionally, the fiducial markings are used to determine location and/or orientation of the object responsive to a 3D depth map of the object and/or of a scene in which the object is located.

An aspect of some embodiments of the invention relates to determining the person's spatial location and body pose, also referred to as "posture", and integrating the location and/or pose with the location and orientation of the object.

According to an aspect of some embodiments of the invention, the object is a simulation of a lightsaber, optionally for use by a player, hereinafter a "combatant", in a star-wars type combat game generated and controlled by a suitable computer.

In an embodiment of the invention, a combatant holding the lightsaber is imaged to provide a video of the combatant, optionally using a 3D imaging system that provides real time video rate depth maps and images of the combatant. The depth maps and/or images are processed by the computer to determine 3D spatial location and orientation of the lightsaber and optionally location of the combatant and the combatant's posture as a function of time. The computer uses the location and orientation of the lightsaber and optionally of the combatant to animate an avatar holding a lightsaber in the star-wars combat game presented on a suitable video screen controlled by the computer.

For convenience of presentation, to distinguish the lightsaber held by the combatant from a lightsaber held by an avatar on a video screen, the avatar's lightsaber is generally referred to as an "avatar lightsaber" and the combatants lightsaber is generally referred to as a "combatant lightsaber".

Optionally, the combatant lightsaber comprises a handgrip, a protective hand guard referred to as a "tsuba", and a lightsaber "stub-shaft". The handgrip and lightsaber stub-shaft are optionally substantially cylindrical and share a common axis, hereinafter referred to as a "lightsaber axis". The tsuba is located along the lightsaber axis between the lightsaber stub-shaft and handgrip and extends away from the lightsaber axis so that from various viewpoints from which the lightsaber may be viewed, the stub-shaft is projected onto, i.e. "shadows", at least a portion of the tsuba. Optionally, the tsuba is formed having a planar region substantially perpendicular to the lightsaber axis. Optionally, the planar region is characterized by a rotational symmetry relative to the lightsaber axis. Optionally the planar region is circular. A projection of the stub-shaft onto the tsuba in an image of the lightsaber acquired from a viewpoint of the 3D imaging system imaging the lightsaber provides an indication of the orientation of the lightsaber. Generally, orientation of the lightsaber affects a shape of the tsuba in an image of the lightsaber and optionally the imaged shape is used to determine orientation of the lightsaber.

Optionally, surface regions of the stub-shaft and tsuba are fabricated so that a projection of the stub-shaft on the tsuba is relatively easily determined. Optionally, surface regions of the tsuba and stub-shaft are configured to have reflectivities that differ sufficiently to aid in distinguishing the projection in an image of the combatant lightsaber. In an embodiment of the invention, surface regions of the tsuba are covered or formed to have a relatively high reflectivity for light that is used to image the lightsaber.

In an embodiment of the invention, the lightsaber is provided having at least one reflective fiducial that is relatively easily identified in an image of the lightsaber. The identified at least one fiducial is used to determine spatial location and/or orientation of the light saber responsive to location and orientation of the at least one bright fiducial in the image.

Optionally, the at least one reflective fiducial, hereinafter also referred to as a "bright fiducial", comprises a reflective element shaped so that it appears to have a substantially same, relatively intense brightness when illuminated by light from a light source located near the camera. Optionally, the bright fiducial comprises a spherical region located at the tip of the lightsaber stub-shaft and having a center located substantially along the lightsaber axis. Optionally, the at least one reflective fiducial comprises an annular region having an axis of rotation substantially coincident with the lightsaber axis. In an embodiment of the invention, the at least one bright fiducial is identified responsive to its reflectivity. Optionally, the reflectivity is determined responsive to data provided by depth maps and images of the combatant and lightsaber provided by the 3D imaging system.

In an embodiment of the invention, for convenience of use and safety, the combatant lightsaber stub-shaft is relatively short and optionally is less than or equal to about 30 cm. Optionally, the combatant lightsaber comprises an activation mechanism operable by the combatant to provide a signal to the computer to indicate that the combatant lightsaber is activated. When not activated, the avatar lightsaber is shown having a stub-shaft that "mimics" the stub-shaft of the combatant lightsaber. When activated, the avatar lightsaber is shown having a relatively long "light blade" that extends from the avatar lightsaber tsuba and replaces the stub-shaft. Optionally, the activation mechanism comprises a mechanical mechanism operable to provide a visual cue that is detected by the 3D imaging system to provide a signal that activates the combatant and avatar lightsaber. Optionally, the activation mechanism comprises a circuit that is operated to activate the combatant and avatar lightsaber by pressing a button switch on the combatant lightsaber handgrip or by applying pressure to the handgrip. Optionally, the activation circuit comprises a light that gets turned on to indicate that the lightsaber is activated when the activation circuit is operated. Optionally, the computer determines that the circuit is operated and the light turned on responsive to an image provided by the imaging system that images the combatant and combatant light saber. Optionally, the activation circuit comprises a transmitter that transmits an "activation signal", such as an RF signal, receivable by a suitable receiver coupled to the computer when the combatant lightsaber is activated.

In some embodiments of the invention, the lightsaber stub-shaft of the combatant lightsaber is configured to be fitted with a relatively long extension that simulates a light blade. Optionally, the extension is formed as a tube from a suitable light, but stiff, material, such as a polyurethane. The tube is formed having a lumen so that it may be securely mounted to the combatant's lightsaber stub-shaft. Optionally, the material from which the extension is made is substantially translucent and/or filled with a suitable translucent material and the lightsaber comprises a light source. When the lightsaber is activated, the extension is visibly illuminated along its length providing an impression of a light blade.

There is therefore provided in accordance with an embodiment of the invention, a method of interfacing a person with a computer, the method comprising: providing the person with a device having: a shaft having an axis; a tsuba connected to the shaft and having a first side that extends away from the axis and faces the shaft; and a handgrip on a second side of the tsuba opposite the first side; acquiring an image of the device; determining an orientation of the device responsive to the image; and generating an action by the computer responsive to the orientation.

Optionally, determining an orientation comprises determining a projection of the shaft on the tsuba.

Additionally or alternatively, determining an orientation optionally comprises determining a shape for the tsuba in the image relative to a known shape of the tsuba. Optionally, the tsuba has a circular periphery. Optionally, determining the shape of the tsuba in the image comprises determining a major and minor axis of the shape in the image.

In some embodiment of the invention the method comprises determining 3D spatial coordinates for the device responsive to the determined shape.

In some embodiment of the invention the method determining an orientation comprises determining a polar angle of the axis relative to a coordinate system. Optionally, determining a polar angle comprises removing a degeneracy in the determination of the polar angle. In some embodiment of the invention the method determining an orientation comprises determining an azimuth angle of the axis.

In some embodiment of the invention determining an orientation comprises: determining 3D spatial coordinates for each of three regions of the device in the image; determining whether the coordinates lie substantially along a same straight line; and using the coordinates to determine the orientation.

In some embodiment of the invention the method comprises providing the surface of the shaft and the first surface of the tsuba with relatively enhanced contrast. Optionally, providing relatively enhanced contrast comprises providing the surface of the tsuba with relatively high reflectivity. Additionally or alternatively, providing relatively enhanced contrast optionally comprises providing the surface of the shaft with relatively low reflectivity.

In some embodiment of the invention the method comprises providing the device with at least one fiducial marking to aid in locating a feature of the device. Optionally, the at least one fiducial marking comprises a relatively bright reflective fiducial at an end of the shaft. Optionally, the method comprises configuring the fiducial at the end of the shaft to have a substantially same brightness irrespective of orientation of the device. Additionally or alternatively, the fiducial at the end of the shaft optionally comprises a highly reflective spherical surface. In some embodiments of the invention, the at least one fiducial marking comprises a highly reflective region along the periphery of the tsuba.

In some embodiments of the invention, acquiring an image comprises acquiring a 3D depth map image of the device.

In some embodiments of the invention, acquiring an image comprises acquiring a contrast image of the device.

In some embodiments of the invention, generating an action by the computer comprises animating an avatar. Optionally, the avatar is located in a virtual reality. Optionally, animating the avatar comprises animating the avatar to interact with an element of the virtual reality.

In some embodiments of the invention, the method comprises, comprising determining 3D spatial coordinates for person. Optionally, determining spatial coordinates comprises acquiring a 3D depth image of the person and using the depth image to determine the coordinates. Additionally or alternatively, the method comprises determining location of the avatar in the virtual reality responsive to the determined coordinates.

In some embodiments of the invention, the method comprises, determining posture of the person. Optionally, determining posture comprises acquiring a 3D depth image of the person and using the depth image to determine posture. Additionally or alternatively the method comprises, determining posture of the avatar responsive to the determined posture of the person.

In some embodiments of the invention, the avatar is a first avatar in the virtual reality and the element is a second avatar operating in the virtual reality. Optionally, the second avatar is animated responsive to actions of a person. Optionally, the second avatar is animated in accordance with an embodiment of the invention.

In some embodiments of the invention, the virtual reality is a reality of a computer game. Optionally, the first and second avatars are engaged in combat with each other in the computer game. Optionally, the combat is a simulated star wars combat.

There is further provided in accordance with an embodiment of the invention, a computer readable medium comprising an instruction set for configuring a computer to interface with a person according to a method of any of the preceding claims.

There is further provided in accordance with an embodiment of the invention, a system for interfacing with a person comprising: a human operated device having: a shaft having an axis; a tsuba connected to the shaft and having a first side that extends away from the axis and faces the shaft; and a handgrip on a second side of the tsuba opposite the first side; imaging apparatus for acquiring imaging data of the device; and a computer configured to receive the imaging data and process the received data to determine an orientation of the device and generate an action responsive thereto.

Optionally, the system comprises a computer readable medium comprising an instruction set for configuring the computer to process the received data. Additionally or alternatively, the system comprises a computer readable medium comprising an instruction set for configuring the computer to generate the action.

Optionally, generating an action by the computer comprises animating an avatar. Optionally, the avatar is located in a virtual reality. Optionally, animating the avatar comprises animating the avatar to interact with an element of the virtual reality. Optionally, ein the avatar is a first avatar in the virtual reality and the element is a second avatar operating in the virtual reality. Optionally, the second avatar is animated responsive to actions of a person.

There is further provided in accordance with an embodiment of the invention, a method of interfacing a person with a computer, the method comprising: providing the person with a device having: a platform on which the person stands; a set of gimbals on which the platform is mounted that enables the person to change the orientation of the platform by shifting his or her weight on the platform; and at least one fiducial marking; acquiring an image of the at least one fiducial marking; determining an orientation of the device responsive to the image; and generating an action by the computer responsive to the orientation. Optionally, the at least one fiducial comprises a fiducial along an edge of the platform. Optionally, the at least one fiducial comprises two fiducial markings. Optionally, the two fiducial markings comprise at least two relatively close fiducial markings separated by a relatively small region along the edge that is not marked with a fiducial.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

FIG. 1A schematically shows a perspective view of a combatant holding a lightsaber in accordance with an embodiment of the invention;

FIG. 1B schematically shows a perspective enlarged view of the lightsaber held by the combatant in FIG. 1A, in accordance with an embodiment of the invention;

FIGS. 2A-2F schematically show the lightsaber shown in FIG. 1B rotated through various angles about a same y-axis and how a projection of the lightsaber's stub-shaft on the lightsaber's tsuba and/or images of the lightsaber bright fiducials can be used to determine orientation of the lightsaber, in accordance with an embodiment of the invention;

FIGS. 3A-3E schematically show the lightsaber shown in FIG. 1B rotated through various angles about a same x-axis and how a projection of the lightsaber's stub-shaft on the lightsaber's tsuba can be used to determine orientation of the lightsaber, in accordance with an embodiment of the invention;

FIGS. 4A-4F schematically show the lightsaber shown in FIG. 1B rotated through various angles about an x-axis and a y-axis and how a projection of the lightsaber's stub-shaft on the lightsaber's tsuba can be used to determine orientation of the lightsaber, in accordance with an embodiment of the invention;

DETAILED DESCRIPTION

Figure 1C:
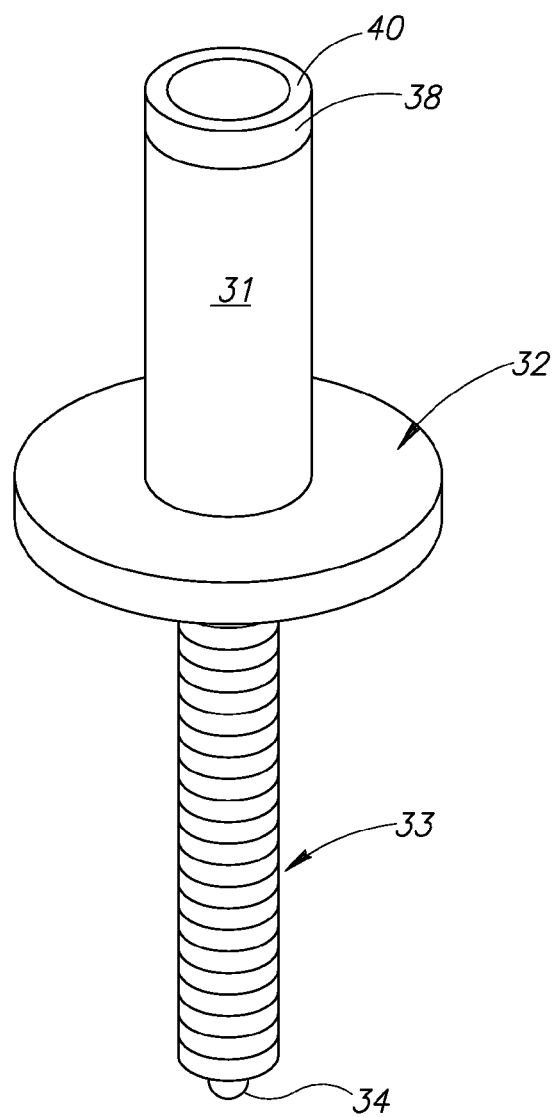
FIG. 1C schematically shows the lightsaber held by the combatant in FIG. 1A from a perspective different from that shown in FIG. 1B, in accordance with an embodiment of the invention.

FIG. 1A schematically shows a player, i.e. a combatant 21 holding a lightsaber 30, shown greatly enlarged in FIG. 1B, and engaged in a star-wars type lightsaber battle, in accordance with an embodiment of the invention. Combatant 21 is optionally interacting with a gaming system 50 comprising a 3D imaging system 52 having an optic axis 53 that provides a depth map as well as an image of the combatant at a video rate of at least thirty images and depth maps per second.

Any of various suitable video imaging cameras and 3D cameras known in the art may be comprised in 3D imaging system 52 to provide video rate images and depth maps of combatant 21. Optionally, 3D imaging system 52, is a gated 3D imaging system comprising an imaging camera for providing an, optionally conventional, image of a scene and a gated, time of flight 3D camera, for providing a depth map of the scene. Various types and configurations of gated time of flight 3D cameras and methods of gating them are described in U.S. Pat. Nos. 6,057,909, 6,091,905, 6,100,517, 6,445,884, 7,224,384, US patent Publication 2007/0091175, PCT Application IL2007/001571 and European Patent EP1214609, the disclosures of which are incorporated herein by reference. To image a scene and determine distances to objects in the scene using a gated 3D camera described in the referenced patents and application, the scene is illuminated with a train of, optionally IR, light pulses radiated from a suitable light source synchronized with gating of the camera. For each radiated light pulse in the train, following an accurately determined delay from the time that the light pulse is radiated, the camera is gated open for a period hereinafter referred to as a "gate". Light from the light pulse that is reflected from an object in the scene is imaged on the photosurface of the camera if it reaches the camera during the gate. An amount of light registered by a pixel in the camera photosurface during the gate is used to determine distance to an object imaged on the pixel.

A suitable computer 54 receives images and depth maps from 3D imaging system 52 and processes the data provided by the images and depth maps to animate an avatar (not shown in FIG. 1A) that represents combatant 21 in lightsaber battle. The computer controls a suitable video screen 55 to display the combatant's avatar and an avatar, an "opponent avatar" (not shown in FIG. 1A), representing the combatant's opponent in the lightsaber battle. Optionally, computer 54 generates the opponent avatar without resort to a real combatant opponent.

Figure 6:
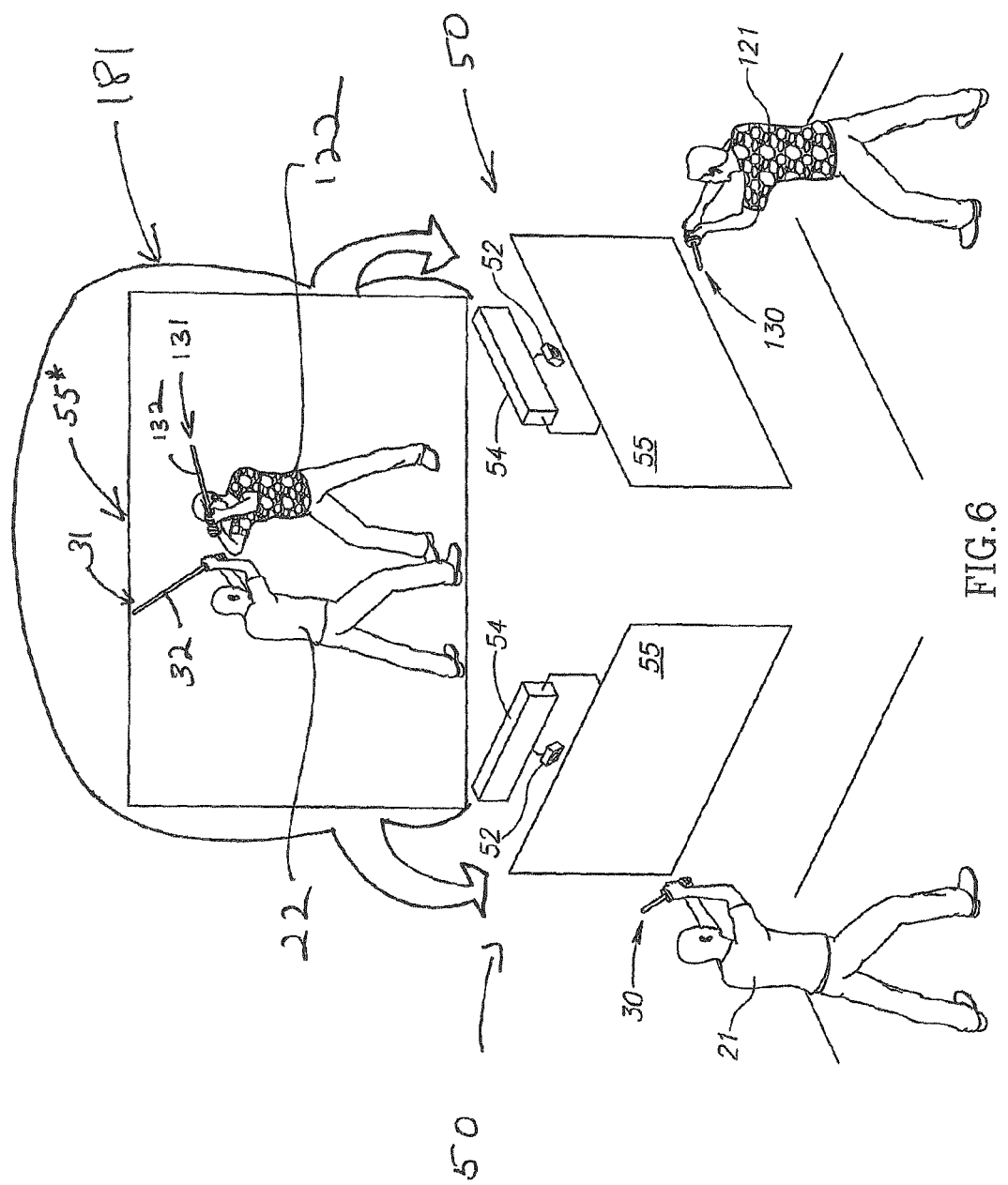
FIG. 6 schematically shows a virtual reality star-wars combat being waged by two combatants, in accordance with an embodiment of the invention.

In some embodiments of the invention the opponent avatar is generated responsive to another "real" player, i.e. a combatant opponent, who interacts with a gaming system similar to gaming system 50 and who is imaged by a 3D imaging system similar to that which images combatant 21. Computers 54 of the two gaming systems communicate with each other so that the avatar animated responsive to combatant 21 and the opponent avatar are located and interact in a common virtual, star-wars reality that is presented to the combatant and opponent combatant on their respective video screens 55. Interaction of a combatant and opponent combatant is illustrated in FIG. 6 and discussed below.

Referring to the enlarged figure of lightsaber 30 schematically shown in FIG. 1B, the lightsaber comprises a handgrip 31, a protective hand guard, tsuba 32, and a lightsaber "stub-shaft" 33 marked along its length with arcs for convenience of presentation. Handgrip 31 and lightsaber stub-shaft 33 are optionally substantially cylindrical and share a common axis 36, hereinafter referred to as a "lightsaber" axis. The tsuba is located along lightsaber axis 36 between lightsaber stub-shaft 33 and handgrip 31 and extends away from the lightsaber axis. Optionally, tsuba 32 is formed having a planar region 37 substantially perpendicular to the lightsaber axis. Optionally, the planar region is characterized by a rotational symmetry relative to the lightsaber axis. Optionally, the planar region is circular. By way of example, in combatant lightsaber 33, tsuba 32 is disc shaped.

Optionally, handgrip 31 comprises an activation button 39 controllable to operate an activation circuit having a transmitter (not shown) comprised in the handgrip. Activation button 39 is pressed to operate the transmitter to transmit a suitable signal, such as an optical or RF signal, to computer 54 to indicate to the computer that the lightsaber is activated. Upon activation, the computer turns on a relatively long light blade in an avatar lightsaber corresponding to lightsaber 30 that is shown on video screen 55 by the computer.

In some embodiments of the invention, tsuba 32 is provided with a configuration of fiducial markings advantageous for determining an orientation of lightsaber 30 that are highly reflective of, optionally IR, light used to image combatant light saber 30 and provide a depth map of the light saber. Optionally, substantially all the surface area of tsuba 32 on a side of the tsuba facing stub-shaft 33 is highly reflective for light used to image the saber. Optionally, at least a portion of a surface area on the rim of tsuba 32 or on a side of the tsuba facing handgrip 31 is highly reflective.

In an embodiment of the invention, surface of stub-shaft 33 has reflectivity that is less than that of reflectivity characterizing highly reflective surface regions of tsuba 32 but the stub-shaft does comprise a highly reflective bright fiducial located at an end of the stub-shaft far from tsuba 32. The stub-shaft bright fiducial can be advantageous for determining a location and/or orientation of lightsaber 30. Optionally, the bright fiducial comprises a highly, optionally IR, reflective spherical surface 34 of a body attached to the end of the stub-shaft.

Optionally, surface of handgrip 31 has reflectivity that is less than that of reflectivity characterizing highly reflective surface regions of tsuba 32 but does comprise a highly reflective bright fiducial located at an end of the handgrip far from tsuba 32 that can be advantageous for determining a location and/or orientation of lightsaber 30. Optionally, the handgrip bright fiducial comprises a highly, optionally IR, reflective cylindrical surface 38. Optionally the handgrip bright fiducial comprises an annular surface 40 schematically shown in FIG. 1C.

In accordance with an embodiment of the invention, a projection of stub-shaft 33 onto tsuba 32 in an image of combatant lightsaber 30 acquired from a viewpoint of 3D imaging system 52 is used to provide location and/or orientation of the combatant lightsaber. Generally, orientation of the combatant lightsaber 30 affects shape of the tsuba in the image of the lightsaber and optionally the imaged shape is used to determine orientation of the lightsaber. For a given orientation of the combatant lightsaber 30, size of tsuba 32 in the image may be used to determine location of the lightsaber. Optionally, location of stub-shaft bright fiducial 34 is used to provide location and/or orientation of combatant lightsaber 30. Optionally, location of handgrip bright fiducial 38 and/or 40 is used to provide location and/or orientation of the lightsaber.

By way of example, FIGS. 2A-4F show schematic perspective images of combatant lightsaber 30 held by combatant 21 in FIG. 1A assuming that the combatant light saber is located substantially along optic axis 53 of 3D imaging system 52 and that the optic axis makes an angle of about 55° to a normal, i.e. the vertical, to the ground. The angle that the optic axis makes with the vertical ground is schematically indicated in FIG. 1A. The figures schematically show combatant lightsaber 30 rotated through various angles, and indicate graphically how a projection of the lightsaber's stub-shaft 33 on the lightsaber's tsuba and/or images of the lightsaber bright fiducials 34 and/or 38 can be used to determine orientation of the lightsaber, in accordance with an embodiment of the invention. The figures also indicate graphically how images of the tsuba and bright fiducials can be used to determine distance of combatant light saber 30 from 3D imaging system 52.

FIGS. 2A-2F schematically show combatant lightsaber 30 rotated through various angles about a same y-axis.

Figure 2A:
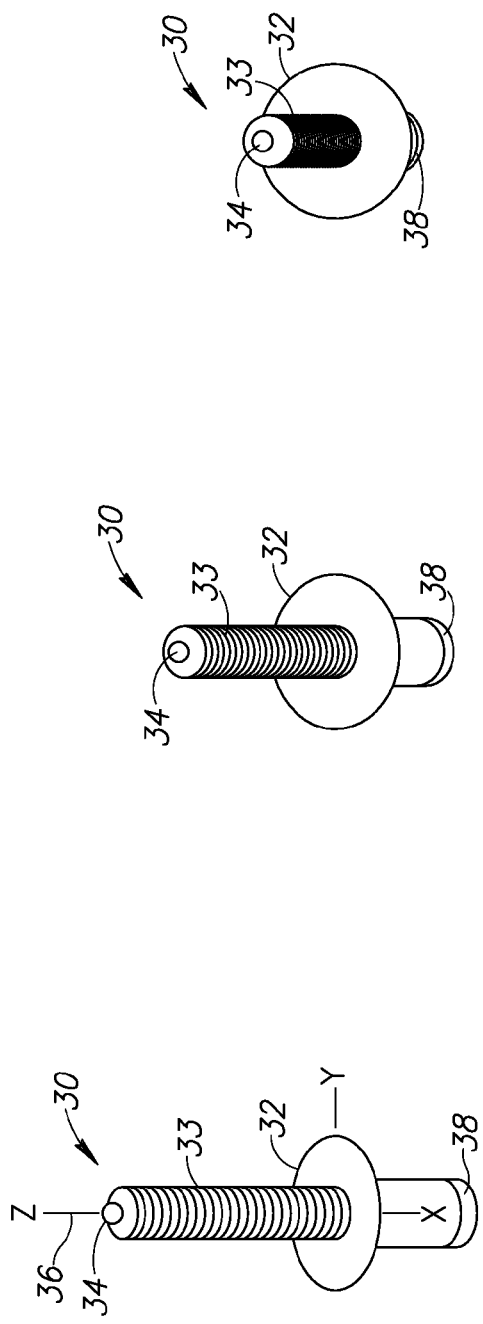
Figure 2B:
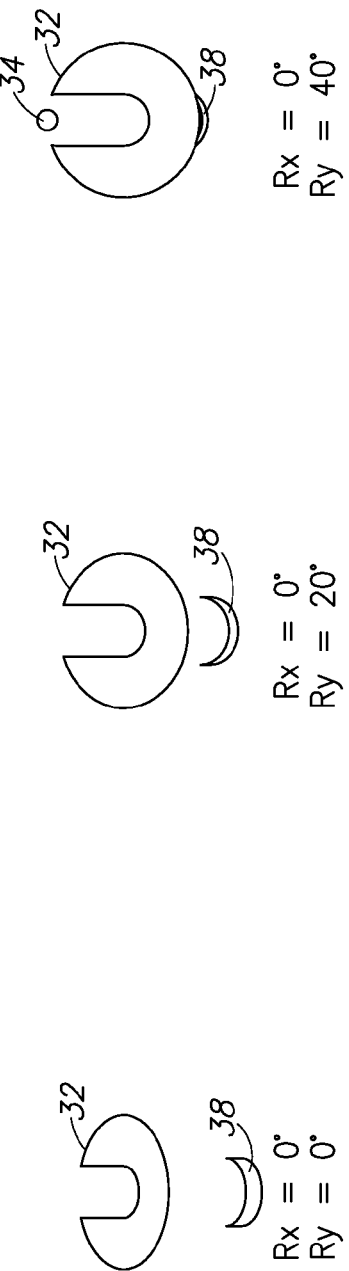
Figure 2C:
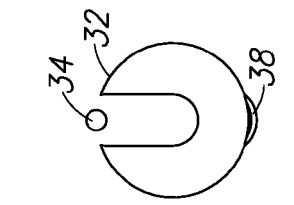

FIG. 2A schematically shows a perspective view of combatant lightsaber 30 being held upright with lightsaber axis 36 substantially perpendicular to the ground. Lightsaber axis 36 in FIG. 2A is assumed to be along a z-axis of a coordinate system having x and y-axes indicated in FIG. 2A that are coplanar with the surface of tsuba 32 facing stub-shaft 33. FIGS. 2B-2F schematically show perspective images of lightsaber 30 rotated about the y-axis shown in FIG. 2A by angles 20°, 40°, 50° 60° and 90° respectively. In FIGS. 2B-2F, the lightsaber is not rotated about the x-axis.

Shown below each figure is an image of the combatant lightsaber's tsuba 32, its stub-shaft bright fiducial 34 and handgrip bright fiducial 38. The rotation angle at which the combatant lightsaber is rotated is shown below the tsuba. For each figure, a projection of the combatant lightsaber's stub-shaft 33 onto the lightsaber's tsuba 32 is removed from the tsuba for the rotation angle at which the lightsaber is imaged by 3D imaging system 52 and shown in the figure. The region removed from the tsuba is a portion of the tsuba that is hidden by the stub-shaft at the angle at which the combatant lightsaber is imaged in the figure and is removed for convenience of presentation to clearly show dependence of the projection on combatant lightsaber orientation. As noted above, in accordance with an embodiment of the invention, stub-shaft 33 has a surface that contrasts with the surface of tsuba 32 so that the portion of the tsuba that is hidden by the stub shaft is relatively easily recognized in an image of combatant lightsaber 30 acquired by 3D imaging system 52.

From FIGS. 2A-2F it is seen that the various rotation angles for which lightsaber 30 is rotated in the figures are readily distinguished from the projection of stub-shaft 33 on tsuba 32 in accordance with an embodiment of the invention. It is further seen that images of stub-shaft bright fiducial 34 and handgrip bright fiducial 33 also provide information that is useable to determine locations and/or orientation of combatant lightsaber 30, in accordance with an embodiment of the invention.

In accordance with an embodiment of the invention, the imaged shape of tsuba 32 is used to determine orientation of lightsaber 30. From the images of tsuba 32 shown in FIGS. 2A-2F it is seen that whereas the tsuba is, optionally, circular, it assumes various different elliptical shapes in the images that are dependent on the 3D spatial orientation of lightsaber 30 and that orientation of the elliptical shapes in the images are also dependent on the lightsaber orientation. A distance of combatant lightsaber 30 from 3D imaging system 52 is optionally determined from a ratio between a size of a major axis of tsuba 32 in an image of the lightsaber and an actual diameter of the tsuba.

Figure 3C:
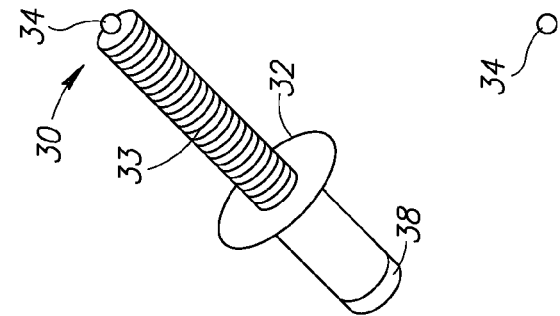
Figure 3C:
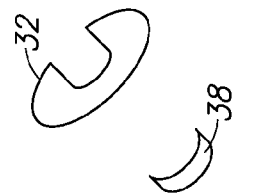
Figure 3B:
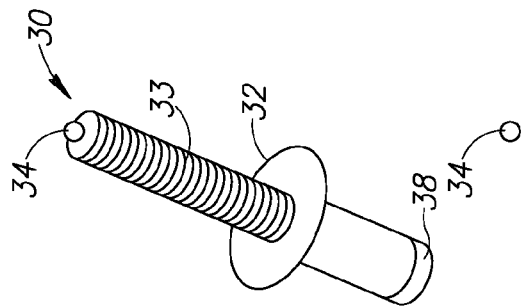
Figure 3B:
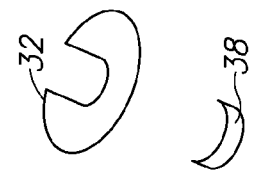
Figure 3A:
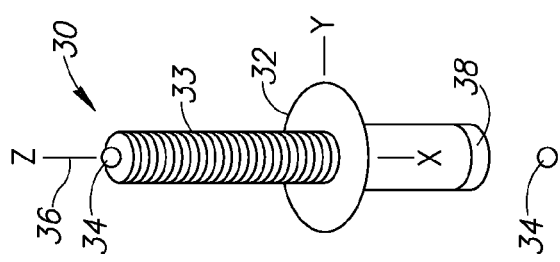
Figure 3A:
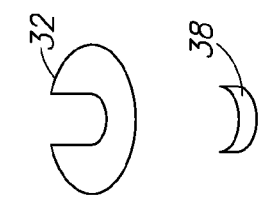
Figure 4F:
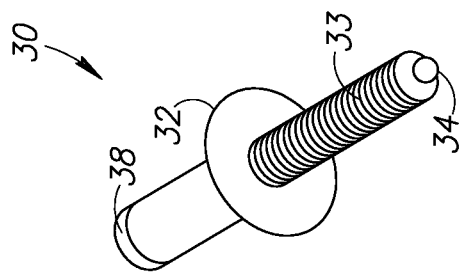
Figure 4F:
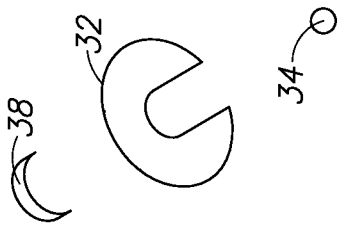
Figure 4E:
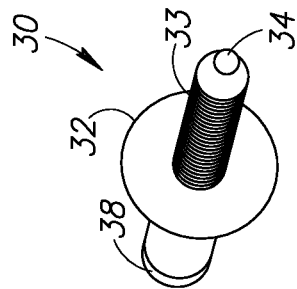
Figure 4E:
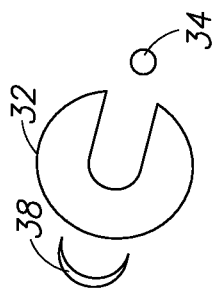
Figure 4D:
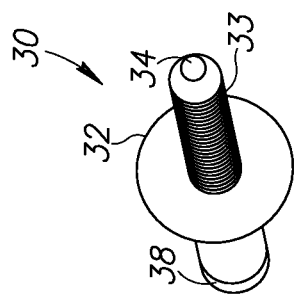
Figure 4D:

FIGS. 3A-3E are similar to FIGS. 2A-2F and show perspective images of lightsaber 30 for rotations only about the x-axis shown in FIG. 3A. Below the lightsaber in each figure the lightsaber's tsuba 32 is shown absent an area of the tsuba that corresponds to a projection of the lightsaber's stub-shaft 33 at the angle at which the lightsaber is imaged by 3D imaging system 52 and shown in the figure. Again it is seen, that in accordance with an embodiment of the invention, the various orientations of the lightsaber shown in FIGS. 3A-3E can readily be distinguished from images of tsuba 32.

FIGS. 4A-4F show perspective images of combatant lightsaber 30 rotated about both the x-axis and the y-axis. As in FIGS. 2A-2F in each FIG. 4A-4F the lightsaber's tsuba 32 with projection removed is shown below the lightsaber, and below the tsuba, the angles of rotation are shown. From the figures, it is seen that the orientations of combatant lightsaber 30 are readily distinguished by the projections of the lightsaber's stub-shaft on its tsuba.

Figure 5:
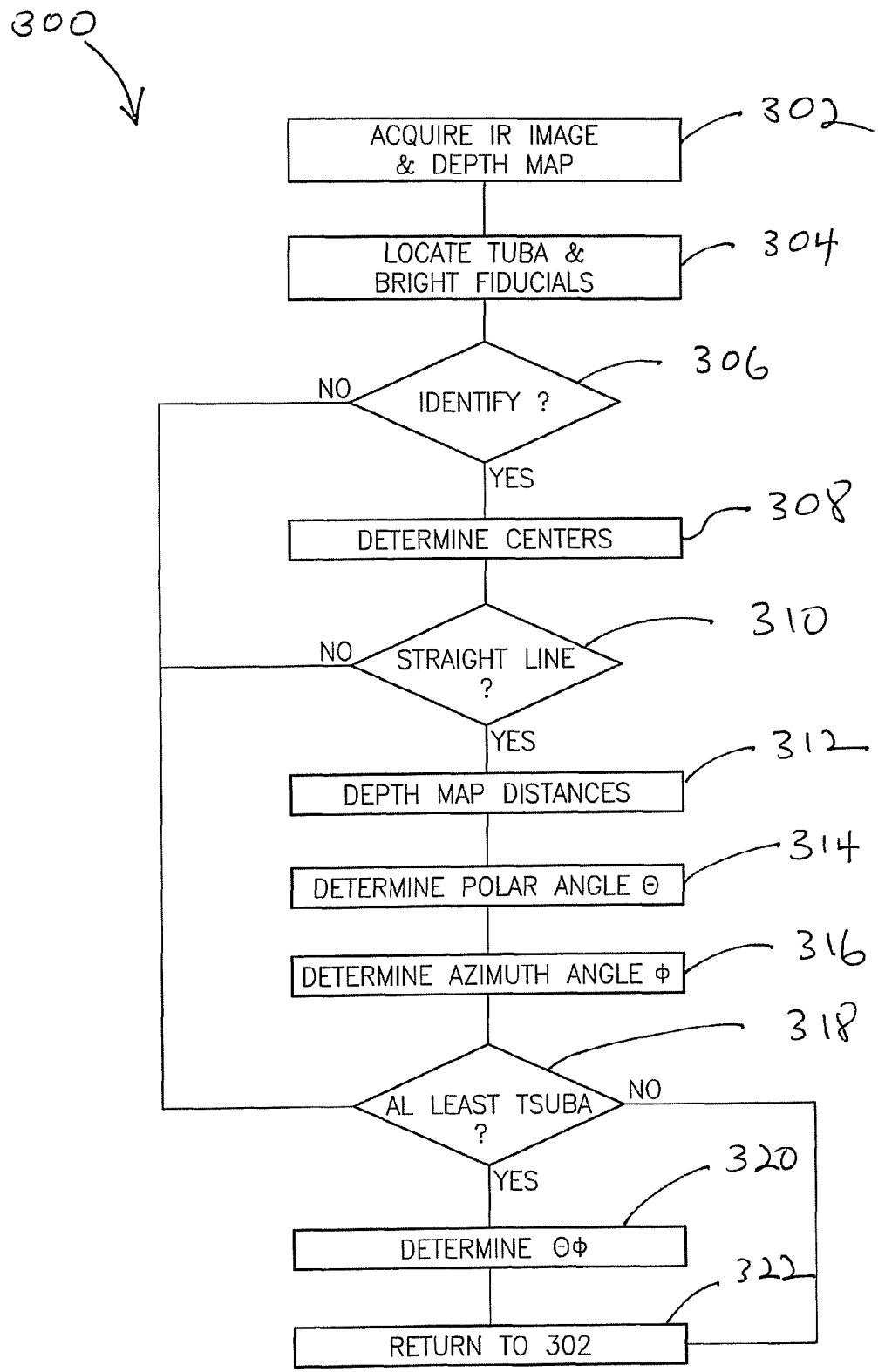
FIG. 5 shows a flow diagram of a method of determining location and orientation of a combatant lightsaber, in accordance with an embodiment of the invention.

FIG. 5 shows a flow diagram of an algorithm 300 used to determine location and orientation of combatant lightsaber 30, in accordance with an embodiment of the invention.

In a first block 302, 3D imaging system 52 acquires an, optionally IR, intensity image of combatant lightsaber 30 (FIGS. 1A-1C) and a depth map of the lightsaber. In a block 304 computer 54 optionally processes the image to locate regions of the image that are candidates for being tsuba 32, stub-shaft bright fiducial 34 and handgrip bright fiducial 38 and/or 40. Location of image regions that are candidates for the tsuba and bright fiducials is aided by the relatively high IR reflectivity that characterizes surfaces of the tsuba and bright fiducials. Upon locating three candidate image regions, optionally in a block 306, each candidate region is identified with a different one of tsuba 32, stub-shaft bright fiducial 34 and handgrip bright fiducial 38 or 39.

Identifying a candidate region with tsuba 32, stub-shaft bright fiducial 34 or handgrip bright fiducial 38 or 39 is aided not only by the optionally substantially different shapes of the tsuba, stub-shaft bright fiducial and handgrip bright fiducial. In accordance with an embodiment of the invention, distance between tsuba 32 and stub-shaft bright fiducial 34 is different than that between the tsuba and handgrip bright fiducial 38 and/or 40. In an image of combatant lightsaber 30, an image of tsuba 32 will always lie between an image of stub-shaft bright fiducial 34 and an image of handgrip bright fiducial 38 and/or 40. And in general, the different actual distances between tsuba 32 and stub-shaft bright fiducial 34 and handgrip bright fiducial 38 or 39 correspond to different distances between their respective images in an image of the lightsaber. As a result, different distances between candidate image regions can be, and optionally are, used to aid in identifying candidate regions with features of lightsaber 30.

In a block 308, optionally, each candidate image region is used to determine a center point that lies on axis 36 of combatant lightsaber 30 for the feature of lightsaber 30 for which it is a candidate. For example, if an image region appears to be a candidate for tsuba 32, the candidate region is used to determine a center point for the tsuba.

In a block 310 the center points are tested to determine if they satisfy a predetermined criterion for lying along a same straight line. If they are determined to lie along a same straight line, algorithm 300 optionally advances to a block 312. In block 312 distances to points along the straight line provided by the depth map are used to determine a distance of combatant lightsaber 30 from 3D imaging system 52. Optionally, the distance is a distance of the center point determined for tsuba 32 in block 308. Optionally, the distance is an average of distances for points along the straight line determined for the center points.

In a block 314 a polar angle "θ" that combatant lightsaber axis 36 (FIG. 1B) makes with optic axis 53 of 3D imaging system 52 is determined responsive to the determined distance, a model of the optics of the 3D imaging system 52 and the image of the lightsaber. It is noted that the polar angle θ is determined to within a degeneracy of order 2, i.e. for a given image there are two solutions for the polar angle θ, one for which stub-shaft bright fiducial 34 (FIG. 1B) is closer to 3D imaging system 52 and one for which the bright fiducial is farther from the imaging system. In accordance with an embodiment of the invention, configuration of tsuba 32 and bright fiducials 34 and 38 and/or 40 are used to determine which solution is adopted. In a block 316 an azimuthal angle φ for lightsaber axis 36 relative to optic axis 36 is determined responsive to the configuration of tsuba 32 and bright fiducials 34 and 38 in the image of the lightsaber.

If in decision block 306 three candidate image regions are not identified, or if in decision block 310 centers for candidate image regions are determined not to lie along a same straight line, algorithm 300 optionally advances to a decision block 318. In decision block 318, a decision is made as to whether a candidate region for tsuba 32 suitable for determining polar and azimuthal angles θ and φ exists in the image of combatant lightsaber 30. If such a candidate is found, in a block 320 a configuration of the candidate image region identified with the tsuba, and if it exists, an image region identified with a bright fiducial, are used to determine polar and azimuthal angles θ and φ.

If in block 318 a decision is made that a suitable candidate for tsuba 318 is not found processing of the acquired image and depth map to determine location and orientation of combatant light saber 30 is abandoned and the algorithm returns to block 302 to acquire another image and depth map.

FIG. 6 schematically shows combatant 21 engaged in a lightsaber battle with another combatant 121 also equipped with a gaming system 50 and wielding a lightsaber 130. For convenience of presentation an inset 181 shows an enlarged image 55* of video screens 55 comprised in gaming systems 50. Enlarged screen 55* shows what combatants 21 and 121 see on their respective gaming system screens, in accordance with an embodiment of the invention. 3D imaging systems 52 of respective combatants 21 and 121 determine 3D spatial locations of the combatants, and optionally their body postures from 3D images provided by the 3D imaging system and 3D spatial positions and orientations of their lightsabers 30 and 130 as described above.

Each computer 54 transmits imaging, position and orientation data to the other computer to enable the computers to generate a common self consistent virtual reality star-wars venue inhabited by avatars 22 and 122 shown on video screens 55 that are animated responsive to motion of combatants 21 and 121 respectively. Avatars 22 and 122 wield avatar lightsabers 31 and 131 respectively that are shown on video screens 55. When combatant 21 or 121 activates his or her activation button 39 (FIG. 1B) on lightsaber 30 or 130 respectively, corresponding combatant lightsaber 31 or 131 glows with an activated light blade 32 or 132. A lightsaber 31 or 131 activated by its corresponding combatant 21 or 121 can be animated to deliver a blow and damage the opposing combatant's avatar 122 or 22 respectively by the corresponding combatant appropriately moving and wielding lightsaber 30 or 130. A blow being delivered by avatar 22 or 122 can also be parried by opponent avatar 122 or 22 if the opponent avatar's combatant 121 or 21 is skillful enough to appropriately wield his or her lightsaber 130 or 30 respectively. A combatant 21 or 121 animates avatar 22 or 122 and the avatars lightsaber 31 or 131 responsive to locations and motion of the avatars in the virtual reality star-wars battle displayed on video screens 55. Contact between avatars and objects in the virtual reality star-wars venue, such as contact between avatar lightsabers 31 and 131 and opponent avatars 122 and 22 is determined using any of various methods known in the art, such as by use of appropriate z-buffers.

It is noted that there are various methods and formats for displaying a virtual reality venue and avatars that inhabit the venues. In FIG. 6 each combatant 21 and 121 sees only a portion of his or her own avatar and observes the avatar's light blade as if in front of combatants eyes. Other methods of presenting a virtual reality and avatars can of course be used and can be advantageous. For example, each computer 54 can control its corresponding video screen to show all of both avatars.

Figure 7:
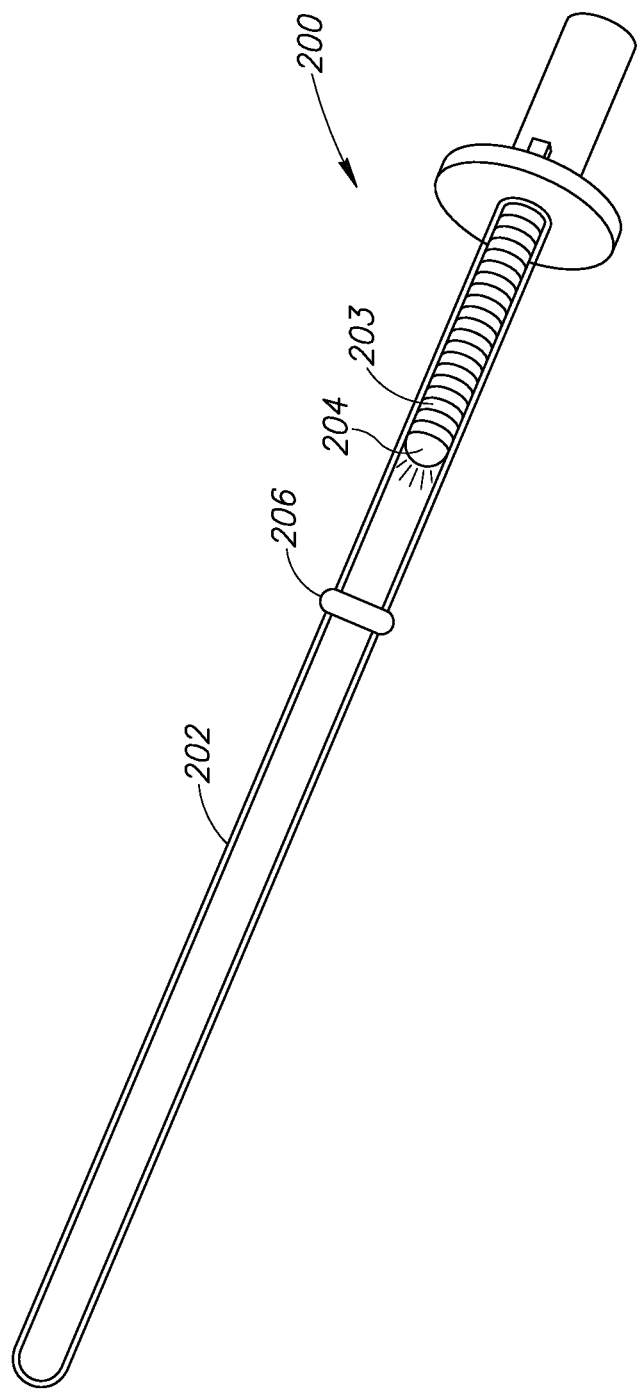
FIG. 7 schematically shows a lightsaber mounted with a light blade, in accordance with an embodiment of the invention.

In some embodiments of the invention, a lightsaber such as a lightsaber similar to lightsaber 30 is equipped to receive a lightweight simulated light blade and the lightsaber comprises a suitable light source for lighting up the light blade when the lightsaber is activated. FIG. 7 schematically shows a lightsaber 200 mounted with a lightweight light blade 202 that fits over a lightsaber stub-shaft 203. Light blade 202 is formed from a material that diffuses and reflects light and lightsaber 200 comprises a light source 204, which when turned on causes the length of light blade 202 to glow. For example, light blade 202 is optionally formed as a tube of polyurethane having internal walls that diffusively scatter light. Optionally, light blade 202 comprises a bright fiducial 206 in the form of a ring externally mounted to the light blade.

Figure 8A:
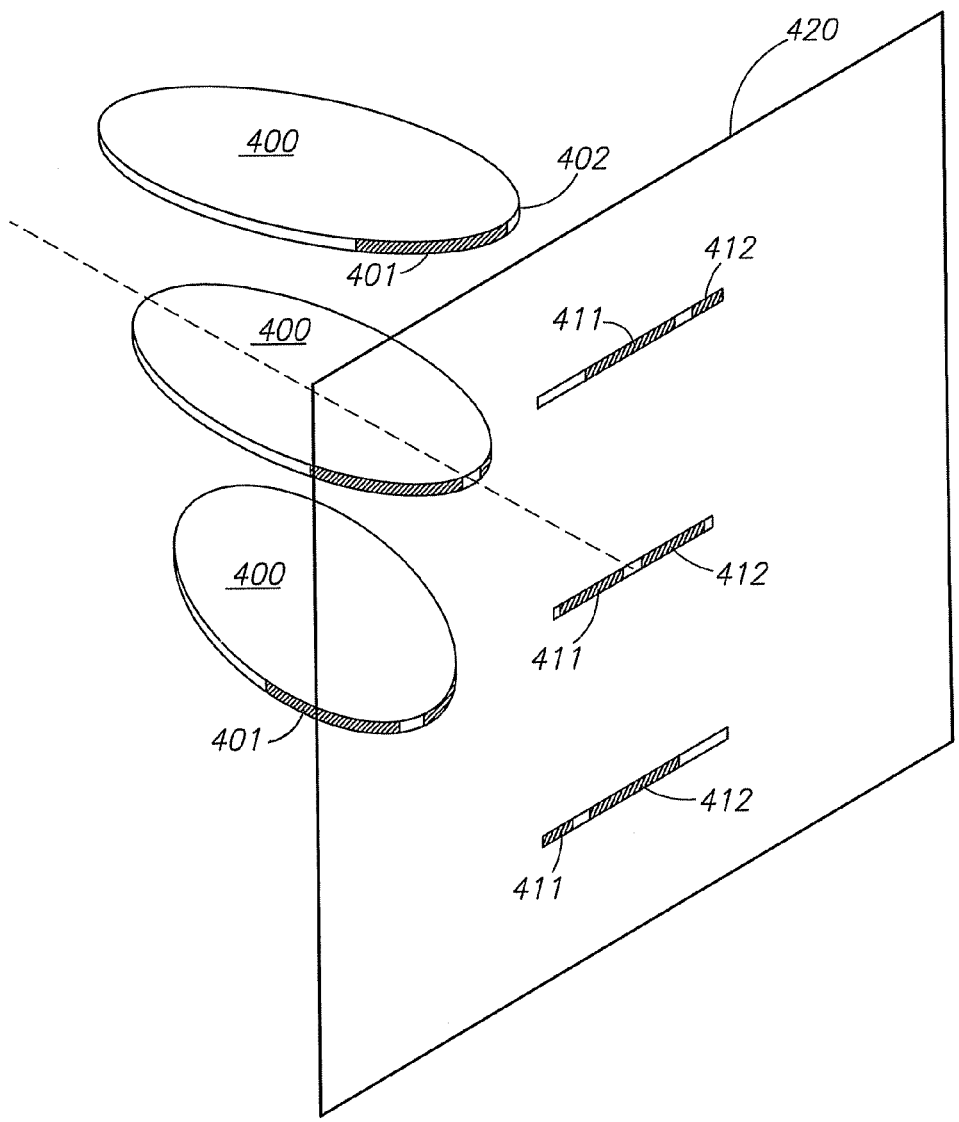
FIGS. 8A-8C schematically show a skate board and bright fiducials on the skate board that are useable to determine orientation of the skate board, in accordance with an embodiment of the invention.
Figure 8B:
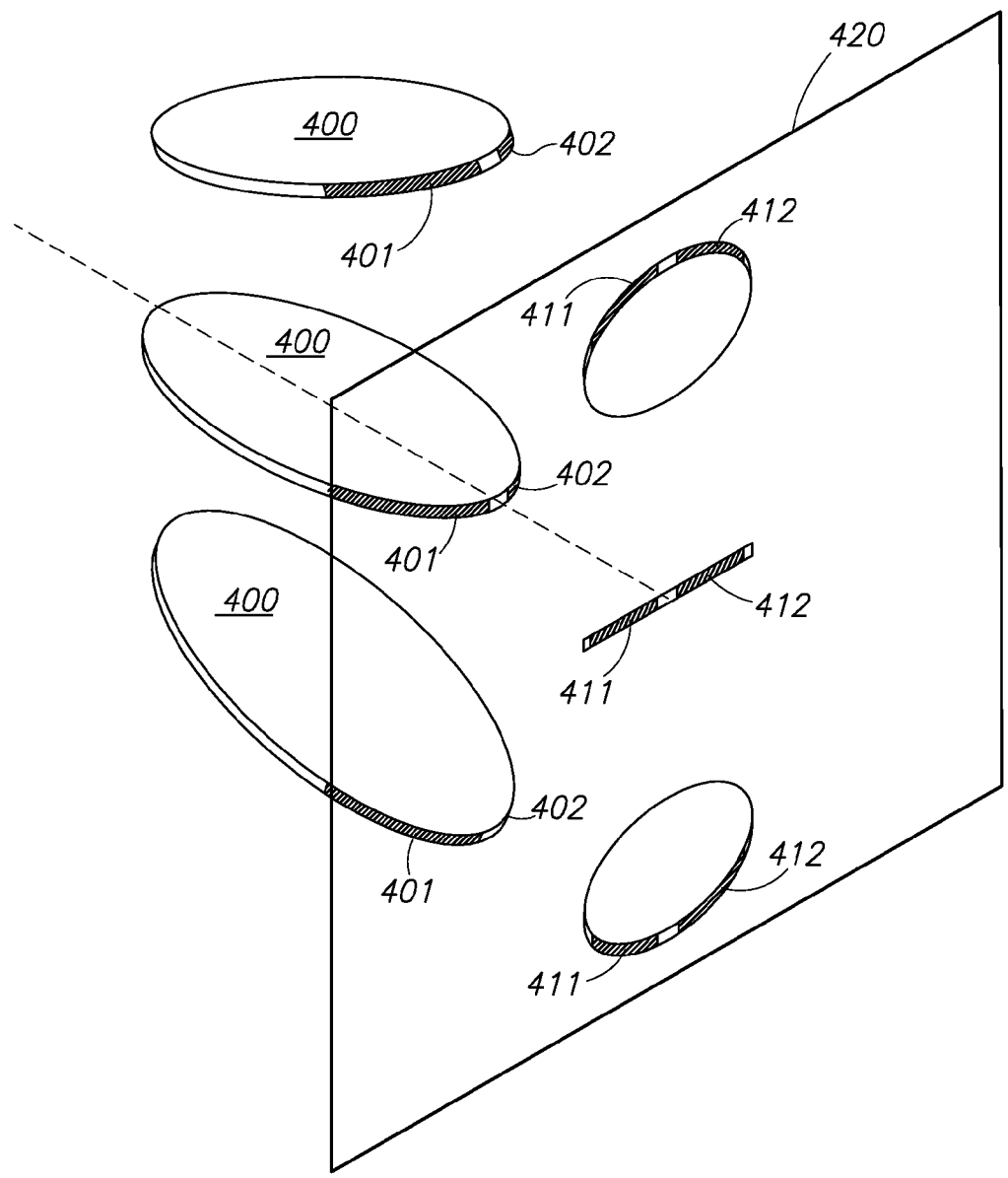
Figure 8C:
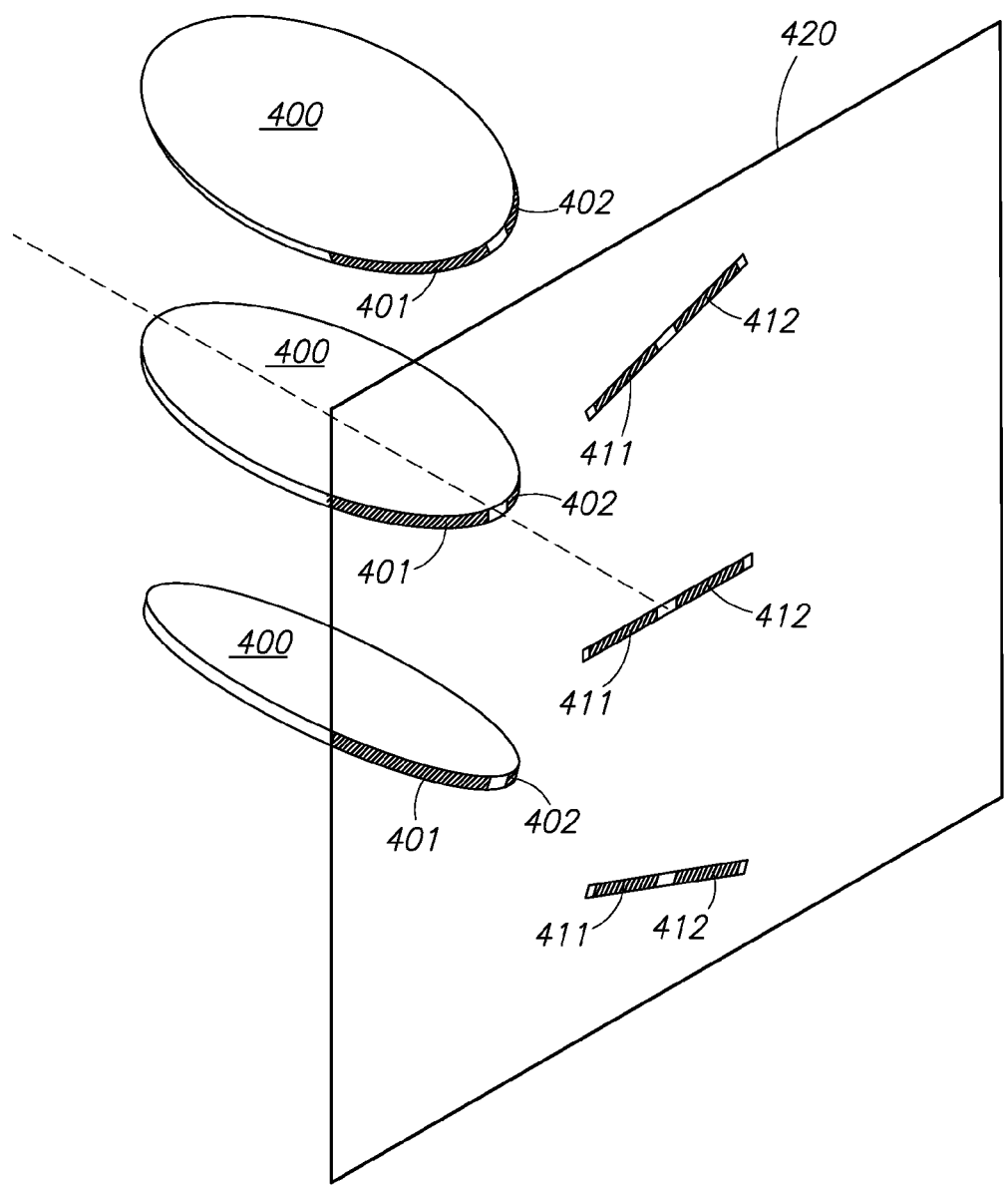

FIGS. 8A-8C schematically show a skateboard 400 having bright fiducial markings 401 and 402 that are used to determined orientation of the skate board in accordance with an embodiment of the invention. Each figure shows a schematic photosurface 420 comprised in 3D imaging system 52 on which the skateboard is imaged. Schematic images 411 and 412 of bright fiducial markings 401 and 412 are shown on photosurface 420 for different orientations of skateboard 400. FIG. 8A schematically shows how images of bright fiducials 401 and 402 on photosurface 420 change with change in yaw angle of skateboard 400. FIG. 8B schematically shows how images of bright fiducials 401 and 402 on photosurface 420 change with change in pitch of skateboard 400. FIG. 8C schematically shows how images of bright fiducials 401 and 402 on photosurface 420 change with change in roll angle of skateboard 400.

It is noted of course that the skate board referred to above is not necessarily a real skate board, but may be any suitable skate board simulator. For example, the simulator optionally comprises a board having a shape similar to that of a skate board but instead of being mounted on wheels is optionally mounted on a set of gimbals that enables a person using the simulator to simulate motion on a skate board.

In the description and claims of the present application, each of the verbs, "comprise" "include" and "have", and conjugates thereof, are used to indicate that the object or objects of the verb are not necessarily an exhaustive listing of members, components, elements or parts of the subject or subjects of the verb.

The invention has been described with reference to embodiments thereof that are provided by way of example and are not intended to limit the scope of the invention. The described embodiments comprise different features, not all of which are required in all embodiments of the invention. Some embodiments of the invention utilize only some of the features or possible combinations of the features. Variations of embodiments of the described invention and embodiments of the invention comprising different combinations of features than those noted in the described embodiments will occur to persons of the art. The scope of the invention is limited only by the following claims.

The invention claimed is:

1. A method of interfacing a person with a computer, the method comprising:
   acquiring an image, the image depicting a device comprising a shaft comprising an axis, a tsuba is connected to the shaft, the tsuba is disc shaped and has a planar circular region, the tsuba has a rotational symmetry relative to the axis, the tsuba comprises a first side that extends away from the axis and faces the shaft and a second side opposite the first side, and a handgrip is on the second side;
   identifying, in the image, an elliptical shape which represents the tsuba and an area of the elliptical shape which corresponds to a projection of the shaft onto the tsuba;
   determining an orientation of the elliptical shape;
   determining a position of the area on the elliptical shape;
   determining an orientation of the device based on the orientation of the elliptical shape and the position of the area on the elliptical shape; and
   generating an action by the computer responsive to the orientation.

2. A method according to claim 1, wherein the elliptical shape has a major axis and a minor axis, and the identifying the elliptical shape of the tsuba in the image comprises determining the major axis and the minor axis in the image.

3. A method according to claim 1, further comprising determining 3D spatial coordinates for the device responsive to the elliptical shape.

4. A method according to claim 1, wherein the determining the orientation of the device comprises determining a polar angle of the axis in a coordinate system, and removing a degeneracy in the determination of the polar angle.

5. A method according to claim 1, wherein the determining the orientation of the device comprises:
   determining 3D spatial coordinates for each of three regions of the device in the image;
   determining whether the coordinates lie along a same straight line; and
   using the coordinates to determine the orientation of the device.

6. A method according to claim 1, wherein the identifying comprises distinguishing the tsuba from the shaft based on a reflectivity of a surface of the shaft which is lower than a reflectivity of a surface of the tsuba.

7. A method according to claim 1, further comprising detecting at least one fiducial marking of the device to aid in locating a feature of the device.

8. A method according to claim 7, wherein the at least one fiducial marking comprises a reflective region along a periphery of the tsuba.

9. A method according to claim 7, wherein the at least one fiducial marking comprises a reflective fiducial at an end of the shaft.

10. A method according to claim 1, wherein the generating the action by the computer comprises animating an avatar, where the avatar is located in a virtual reality.

11. A method according to claim 10, further comprising determining 3D spatial coordinates for the person by acquiring a 3D depth image of the person and using the depth image to determine the 3D spatial coordinates.

12. A method according to claim 11, further comprising determining a location of the avatar in the virtual reality responsive to the 3D spatial coordinates.

13. A method according to claim 10, further comprising determining a posture of the person by acquiring a 3D depth image of the person and using the depth image to determine the posture.

14. A method according to claim 13, further comprising determining a posture of the avatar responsive to the posture of the person.

15. A method according to claim 1, wherein:
   the planar region is substantially perpendicular to the axis of the shaft.

16. A system for interfacing with a person, comprising:
   an imaging apparatus, the imaging apparatus is configured to acquire imaging data of a human operated device, the device comprising a shaft comprising an axis, a tsuba connected to the shaft and comprises a first side that extends away from the axis and faces the shaft and a second side opposite the first side, a handgrip is on the second side, the tsuba is disc shaped and has a planar circular region, and the tsuba has a rotational symmetry relative to the axis; and
   a computer configured to receive the imaging data and process the imaging data to determine an orientation of the device and generate an action responsive thereto, the computer configured to:
      identify, in the imaging data, an elliptical shape which represents the tsuba and an area of the elliptical shape which corresponds to a projection of the shaft onto the tsuba, the elliptical shape has a major axis and a minor axis, and the elliptical shape is identified by identifying the major axis and the minor axis,
      to determine an orientation of the elliptical shape;
      to determine a position of the area on the elliptical shape; and
      to determine an orientation of the device based on the orientation of the elliptical shape and the position of the area on the elliptical shape.

17. The system of claim 16, wherein:
   the elliptical shape of the tsuba which is identified and which is used to determine the orientation of the device is absent the area of the elliptical shape which corresponds to the projection of the shaft onto the tsuba.

18. The system of claim 17, wherein:
   the computer, to identify the area of the elliptical shape which corresponds to the projection of the shaft onto the tsuba, distinguishes the elliptical shape from the shaft based on a reflectivity of a surface of the tsuba which is higher than a reflectivity of a surface of the shaft.

19. A method of interfacing a person with a computer, the method comprising:
   acquiring an image of first and second fiducial markings of a device, the device comprising: a platform on which a person stands and a set of gimbals on which the platform is mounted that enables the person to change an orientation of the platform by shifting his or her weight on the platform, the first and second fiducial markings are along an edge of the platform and are separated from each other;
   determining a change in orientation of the device responsive to the image, the determining the change in orientation comprises determining a yaw angle, a roll angle and a pitch angle of the platform based on the image of the first and second fiducial markings; and
   generating an action by the computer responsive to the orientation.

* * * * *